United States Patent

Hogan et al.

[11] 4,084,293
[45] Apr. 18, 1978

[54] FISH-BEHEADING MACHINE AND PROCESS

[75] Inventors: Elmer R. Hogan, Bellevue; Charles Edward Hollis; John I. Simpson, both of Seattle, all of Wash.

[73] Assignee: Smith-Berger Manufacturing Corporation, Seattle, Wash.

[21] Appl. No.: 677,157

[22] Filed: Apr. 15, 1976

[51] Int. Cl.² .......................................... A22C 25/14
[52] U.S. Cl. .......................................... 17/52; 17/63
[58] Field of Search .................. 17/60, 52, 59, 57, 63, 17/61

[56] References Cited

U.S. PATENT DOCUMENTS

| | | | |
|---|---|---|---|
| 1,222,926 | 4/1917 | Brierly et al. | 17/63 |
| 1,909,643 | 5/1933 | Waugh | 17/63 |
| 2,507,808 | 5/1950 | Oates | 17/63 |
| 2,507,810 | 5/1950 | Oates | 17/63 |
| 2,541,046 | 2/1951 | Fonken | 17/63 |
| 2,584,567 | 2/1952 | Fonken et al. | 17/63 |
| 2,625,708 | 1/1953 | Oates | 17/52 |
| 3,469,278 | 9/1969 | Oates | 17/63 X |

Primary Examiner—Louis G. Mancene
Assistant Examiner—Paul J. Hirsch
Attorney, Agent, or Firm—Robert W. Beach; Ward Brown

[57] ABSTRACT

The head of a fish, particularly salmon, is severed from the body by first forcing the blunt rounded tip of a beheading knife against a gill cover to punch the gill cover inward. The beheading knife is moved transversely of the fish and is contoured substantially to the contour of the pectoral girdle of the fish with opposite edges tapering toward the blunt tip. The edges of the knife are chamfered at the convex side for wedging engagement with the pectoral girdle of the fish to guide the knife for movement through the fish along the profile of the pectoral girdle.

3 Claims, 5 Drawing Figures

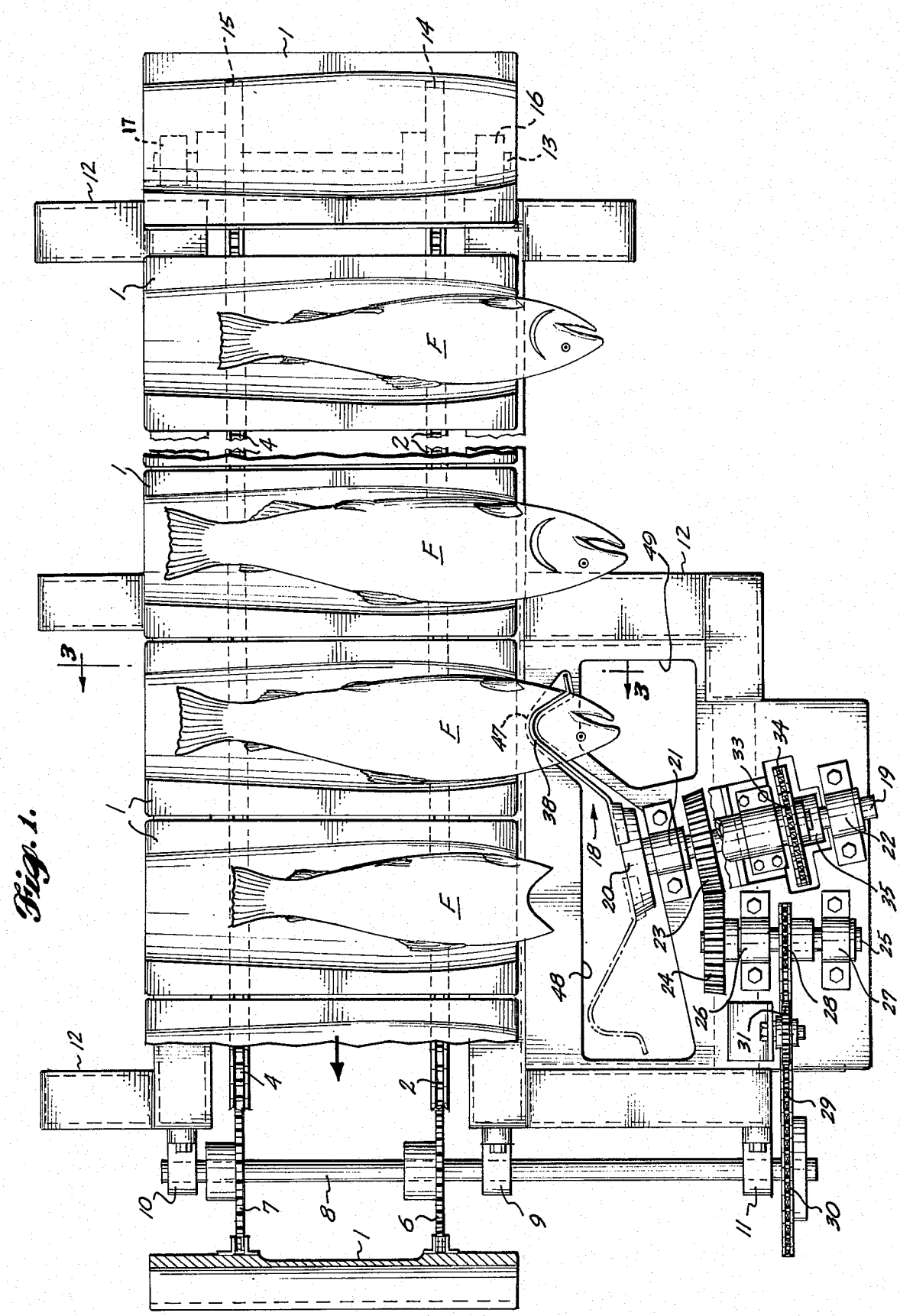

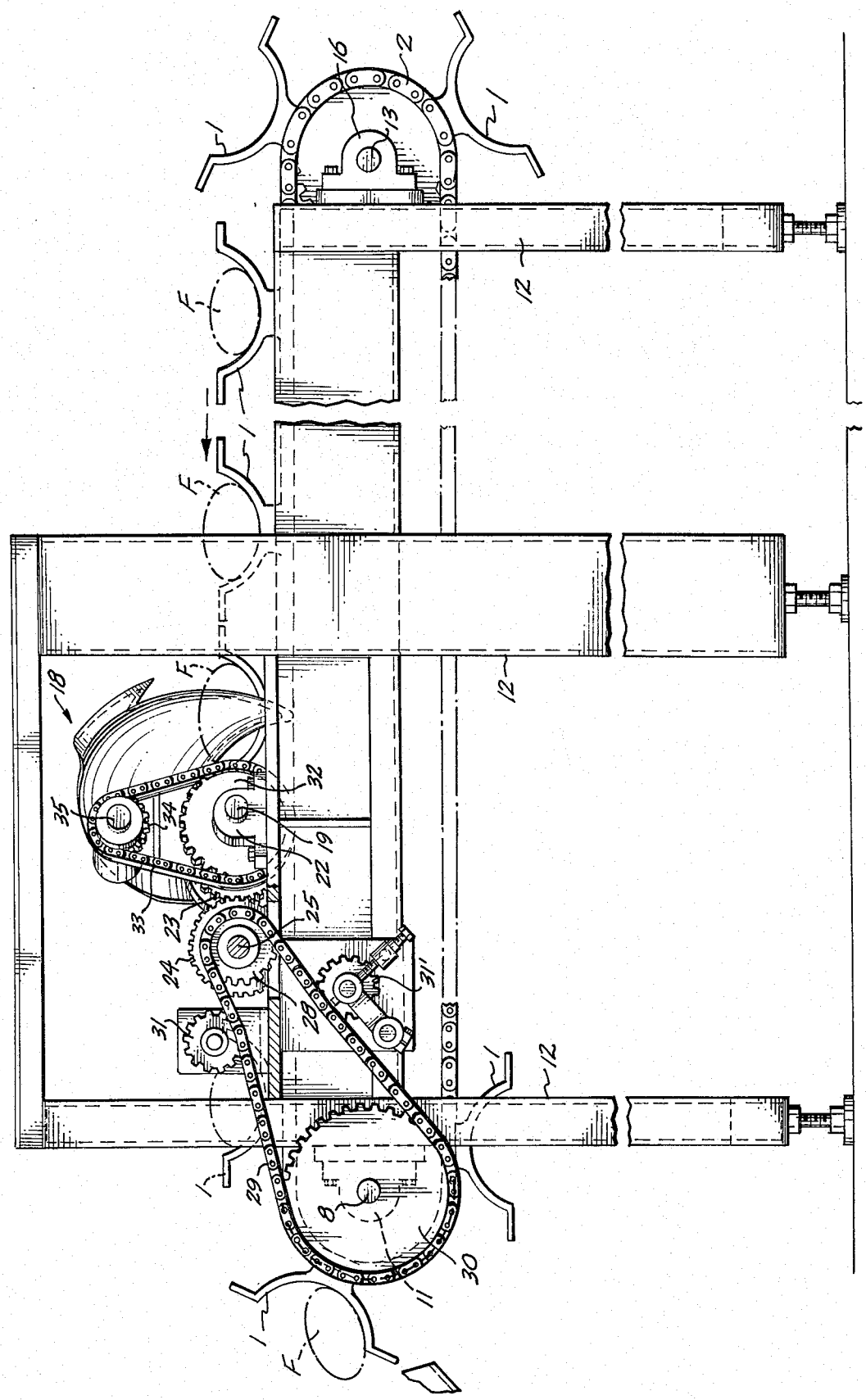

U.S. Patent   April 18, 1978   Sheet 3 of 3   4,084,293
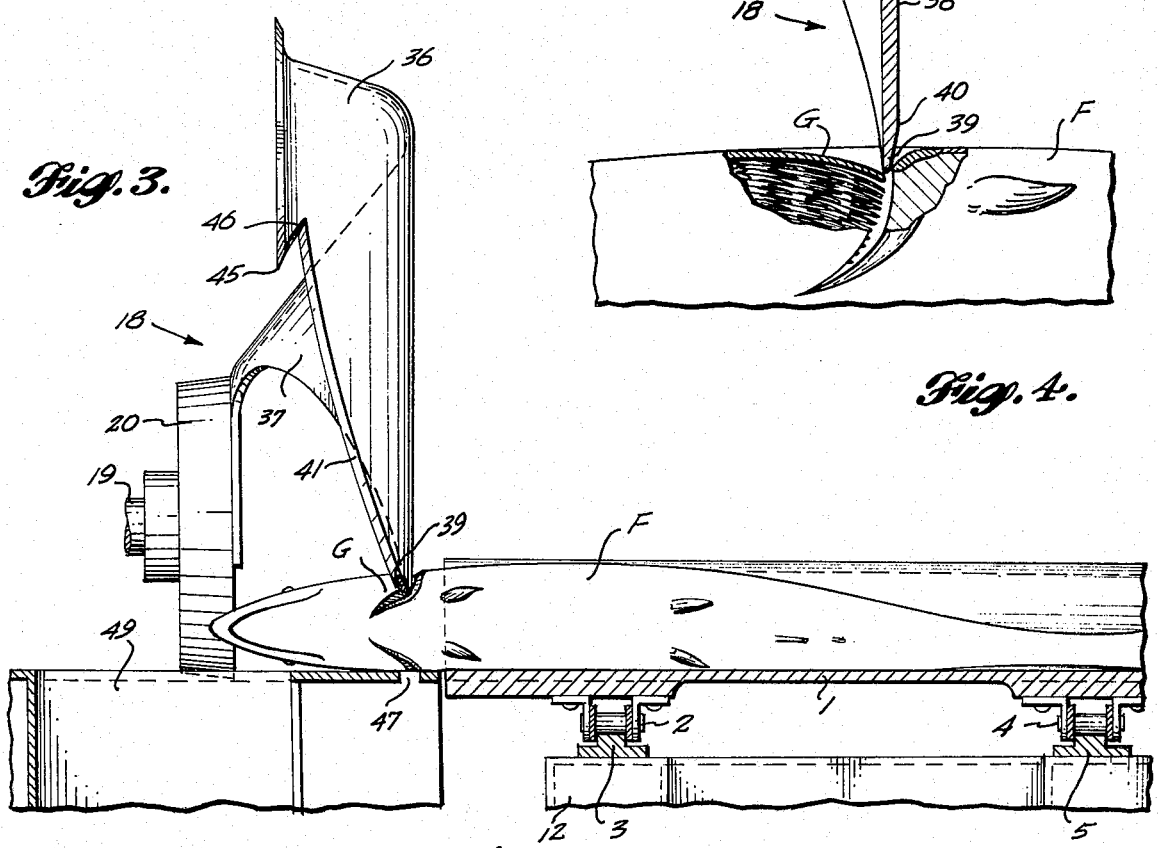
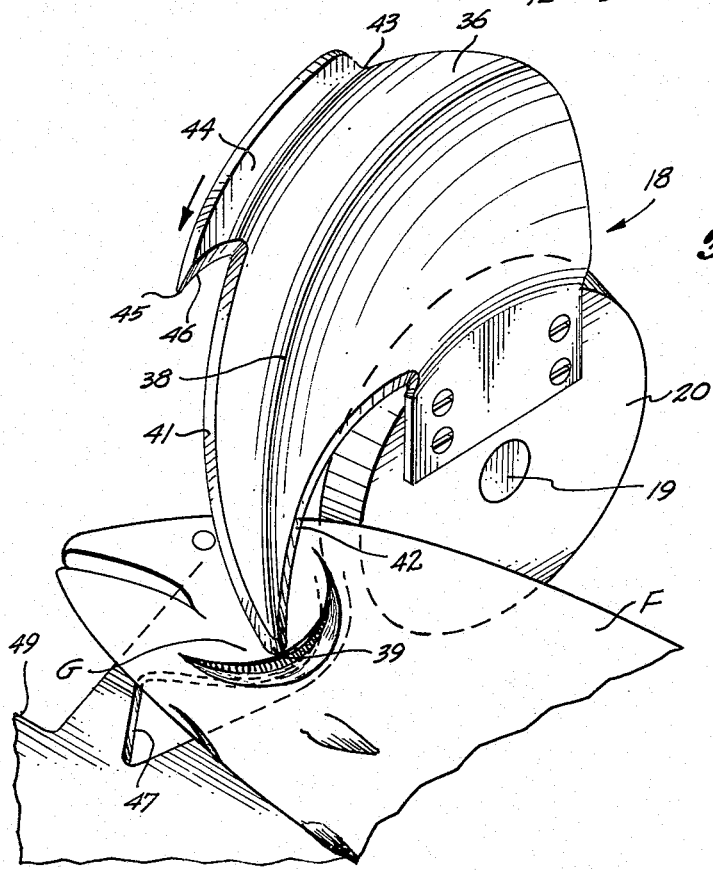

FISH-BEHEADING MACHINE AND PROCESS

BACKGROUND OF THE INVENTION

1. Field of the Invention

This invention relates to fish-beheading machines and, more particularly, to machines for beheading fresh salmon.

2. Prior Art

Various fish-beheading machines have been utilized in the past, particularly for beheading salmon and particularly for use in conjunction with the Iron Chink, which is a machine for mechanically removing the entrails from the fish and cleaning the visceral cavity of the fish. Examples of patents showing fish beheading machines are U.S. Pat. Nos. 3,469,278; 2,625,708; 2,625,706; 2,529,800; 2,346,935 and 1,222,926.

SUMMARY OF THE INVENTION

While fish-beheading machines have been used extensively for beheading salmon in preparation for canning, salmon to be frozen or sold fresh either have not been cleaned at all or have been hand butchered. It is a principal object of the present invention to expedite the butchering of fish, and particularly salmon, for the fresh or frozen market by beheading such fish mechanically.

Salmon butchered for the fresh market or for freezing are usually of higher quality than salmon butchered for canning. Consequently, it is particularly desirable to save as much meat of such fish as possible. It is an object to behead fish for the fresh market or for freezing in a manner which will conserve meat yet which can be performed automatically.

A further object is to provide a fish-beheading machine which will operate effectively and automatically to behead fish of various sizes within a considerable range.

It is also an object of the invention to behead a fish by a clean cut.

The foregoing objects can be accomplished by forcing the blunt tip of a beheading knife against a portion of the gill cover adjacent to the collar bone for punching the gill cover inward, followed by moving the knife alongside the collar bone transversely of the fish to complete the severance of the head from the body.

BRIEF DESCRIPTION OF THE DRAWINGS

FIG. 1 is a plan of a fish-beheading machine in accordance with the present invention having parts broken away.

FIG. 2 is a side elevation of the beheading machine.

FIG. 3 is a fragmentary transverse section through a portion of the beheading machine taken on line 3—3 of FIG. 1.

FIG. 4 is an enlarged detail vertical section of a portion of the beheading knife shown in FIG. 3.

FIG. 5 is a top perspective of the beheading knife and a portion of the fish support.

DETAILED DESCRIPTION

In order to accomplish the beheading operation, it is necessary for a beheading knife and a fish to be moved relatively so that the knife will effect a chopping action at the base of the fish head. In addition, it is preferred that fish-supporting and transporting means be provided which will move fish successively to a beheading station and which will then move the beheaded fish away from the beheading station for further processing.

Further, it is important that, at the time of the beheading operation, each fish is located precisely relative to the beheading knife and that such relationship be maintained during the beheading operation.

In the preferred type of beheading machine shown in the drawings, a plurality of dished fish-carrying trays 1 are arranged in a row, as shown in FIG. 1, and connected together to be moved past a beheading station. The trays 1 are connected together by a roller chain 2 riding on a track 3, as shown in FIG. 3, and by a roller chain 4 parallel to and spaced lengthwise of the trays from the chain 2, chain 4 being carried by a track 5. The chains 2 and 4 are endless so as to carry the trays 1 in an orbit having parallel upper and lower stretches.

The chains 2 and 4 are driven in synchronism by engagement with sprockets 6 and 7, respectively, secured to a common shaft 8. Such shaft is mounted in bearings 9, 10 and 11 on one end portion of the beheading machine frame 12. At the opposite end of the machine frame, a shaft 13 carrying sprockets 14 and 15 is mounted on the frame by bearings 16 and 17. Such sprockets 14 and 15 engage with the loops of chains 2 and 4, respectively, at the end of the machine frame remote from shaft 8. Shaft 13 is merely an idler shaft, the chains being driven by the sprockets 6 and 7. The chains must be driven in synchronism with rotation of the beheading knife 18 located at a beheading station alongside the path of movement of the trays 1. Such beheading knife is attached to a disk 20 which is mounted on a shaft 19. Such shaft is mounted on the frame 12 of the beheading table by bearings 21 and 22 spaced lengthwise of the shaft.

The beheading knife 18 is rotated in synchronism with movement of the trays 1 by interconnecting knife shaft 19 and shaft 8 that drives the sprockets engaging the chains 2 and 4 which connect the trays. Such interconnection is effected by a slightly beveled gear 23 mounted on knife shaft 19 and engaged with a similarly slightly beveled gear 24 mounted on an intermediate shaft 25. Such intermediate shaft is mounted on the machine frame by bearings 26 and 27 spaced lengthwise of such shaft.

Intermediate shaft 25 carries a sprocket 28 between the bearings 26 and 27, which sprocket, as shown in FIGS. 1 and 2, engages a roller chain 29 that is also engaged with a sprocket 30 mounted on the end of shaft 8. The relative sizes of sprockets 28 and 30 are such that for each revolution of beheader knife shaft 19 and intermediate shaft 25, sprocket 30, shaft 8 and sprockets 6 and 7 will be turned sufficiently to shift chains 2 and 4 lengthwise a distance equal to the distance along such chains between the centers of trays 1. The chain 29 will connect the sprockets 28 and 30 in the phase relationship such that the center of a tray 1 is located at the beheading station when the knife 18 is being driven downward through the beheading station by rotation of shaft 19. The chain 29 is held by one or more chain tighteners 31 and 31' in position to coordinate the rotation of the knife shaft 19 and the drive shaft 8 for the fish-transporting means, as shown in FIGS. 1 and 2.

Since the rotation of knife shaft 19 and that of conveyor shaft 8 are coordinated through shaft 25 in the manner described above, any of such shafts could be power-rotated. In the drawings knife shaft 19 which drives the fish conveyor shaft 8 through gears 23 and 24, sprockets 28 and 30 and chain 29 is driven by a sprocket 32 secured to such knife shaft. That sprocket engages chain 33 which engages sprocket 34 mounted on the power shaft 35 shown in FIGS. 1 and 2. The speed of the beheading operation can be regulated by selecting or altering the speed of rotation of shaft 35.

FIGS. 1 and 3 show a fish F, such as a salmon, held in a tray 1 at the beheading station. The details of the beheading knife are shown in FIGS. 3, 4 and 5. The beheading knife 18 is made of metal sheet material having a convex side 36 and a concave side 37. The knife blade is bent transversely of an arc extending circumferentially of the axis of shaft 19 to form a ridge 38 to follow substantially the contour of the collar bone or pectoral girdle of a fish F to be beheaded, as indicated in FIG. 1. As shown in FIGS. 4 and 5, the tip 39 of the blade is rounded and blunt, instead of being pointed and sharp, and the convex side of such tip has a chamfer 40, as shown in FIG. 4.

The opposite edges or margins of the blade which converge toward the tip 39, as shown in FIG. 5, have chamfers 41 and 42, respectively, on the convex side of the blade which form cutting edges extending nearly to the blunt and rounded tip 39. The ridge 38 is located approximately midway between such cutting edges, as shown in FIG. 5. The outer blade edge having the chamfer 41, radially farther from the axis of shaft 19, is convex and the inner blade edge having the chamfer 42, radially closer to the axis of shaft 19, is concave.

The radially outer portion of the blade is bent at 43 relative to the radially inner portion of the blade to form a flange 44 on the knife elongated circumferentially of the axis of shaft 19. Such flange is spaced a considerable distance circumferentially of the axis of shaft 19 from the knife tip 39. The forward tip of the flange 44 is sharpened to a point 45, and the leading end of such flange inwardly of such point has a chamfer 46 on the concave side of the blade which merges with the radially outer end of chamfer 41 to provide a sharp cutting notch.

During operation of the beheading machine, the beheading blade 18 will be rotated through a complete revolution by its shaft 19 which each tray 1 is moved along the path of movement of the fish through a distance equal to the distance between the spacing of the centers of the trays. Since, as shown in FIG. 2, the entire length of the tapered cutting portion of knife 18 is approximately one-eighth of the orbit of the knife, fish-carrying tray 1 will move only approximately one-eighth of its width while the cutting portion of the knife is passing through the anvil slot 47 in the beheading machine frame. The spacing between the central portions of adjacent trays may be twelve to sixteen inches. Consequently, the travel of each tray along the fish path would be from one and one-half inches to two inches during the actual beheading movement of the knife 18. During the remainder of the movement of the tray past the beheading station, the knife will be moving upward through the larger aperture 48 of the table in preparation for executing the next beheading cut. A further aperture 49 is provided in the table adjacent to slot 47 for discharge of severed fish head through the table.

It is important to be able to conserve as much meat at the back and neck of the fish as possible during the beheading cut. In order to accomplish this objective, the pectoral girdle of the fish bordering the gill cavity is utilized as a gauging element to locate the beheading knife 18 in the optimum relationship to the fish. The knife blade tip 39, as shown in FIGS. 4 and 5, is not pointed and sharp but is rounded and blunt so that it will slide relative to the gill cover G. As the knife blade 18 is driven downward, its tip will be forced against the edge portion of the gill cover, as shown in FIGS. 4 and 5, and will punch the gill cover inward past the pectoral girdle bordering the gill cavity. The chamfer 40 and/or the chamfers 41 and 42 will bear on the pectoral girdle of the fish and, if necessary, slide the fish tailward so as to cut as little meat as possible off the back and neck of the fish adjacent to the opposite extremities of the pectoral girdle.

Each fish F is initially positioned in a tray 1 with its pectoral girdle approximately in alignment with the slot 47 in the direction of movement of the fish along the beheading path. Since the tip 39 of the beheading knife is blunt, rather than being sharpened, it will not immovably impale the fish, but the fish and tip can slide relatively both lengthwise and transversely of the fish as the knife tip is punching the gill cover inward. The tip chamfer 40 and/or a marginal chamfer 41 or 42 on the convex side of the knife will slide downward along the pectoral girdle, wedging the fish tailward as may be necessary, until rotation of the knife causes one or both of its edges sharpened by chamfers 41 and 42 to reach an extremity of the pectoral girdle. During further rotation of the knife relative to the slot 47, the concave edge of the knife sharpened by chamfer 42 will slice through the back of the fish and the convex edge of the knife sharpened by the chamfer 41 will slice through the throat of the fish. The notch at the radially outer portion of the blade sharpened by the chamfer 46 will insure that the throat is severed completely.

As shown best in FIG. 1, the bend 38 of the knife extending circumferentially of the axis of shaft 19 and the bend of the slot 47 conform closely to the bent shape of the pectoral girdle of a fish. Despite considerable variation in size of salmon, the profile of the pectoral girdle does not differ greatly, and, consequently, the pectoral girdle line will be followed by the knife quite accurately in each instance. Moreover, because the bent contour of the knife corresponds closely to the contour of the pectoral girdle, engagement of the knife with the hard pectoral guide will wedge the fish to move it transversely of its length as necessary to maintain substantial coincidence between the knife and the contour of the pectoral girdle during the operation of severing the head of the fish.

If the fish is thus moved an inch or two transversely of its length relative to the tray 1 in which it is cradled during a beheading operation, the knife, using the pectoral girdle of the fish as a guide, will punch through the central portion of the fish and slice through the back and neck portions in registration with the pectoral girdle to sever the head from the fish with the least waste of meat at the back and throat. The severed head will drop through the aperture 49 in the beheading table shown in FIG. 1, and the beheaded body will be carried on to the left, as seen in FIG. 1, by the tray 1 for further processing.

We claim:

1. In a fish-beheading machine including fish-supporting means, a fish-beheading knife and means for effecting relative movement of the fish-supporting means and the knife to effect a relative chopping movement of the knife and the fish to behead the fish, the improvement comprising the knife being of one-piece plate structure having a single blunt tip portion formed integral with and disposed in continuation of a cutting portion, said cutting portion having opposite convex and concave sides, said convex side being contoured to correspond approximately to the profile of the headward side of the pectoral girdle of a fish supported by the fish-supporting means and said cutting portion of the fish-beheading knife having opposite edges sharpened over the major portion of the knife length and width and converging toward said single blunt tip portion located generally centrally of the knife width for punching engagement of said tip portion with the gill cover of the fish, said converging edges of the knife cutting portion being sharpened by being chamfered only on the convex side of the knife cutting portion, which chamfered edges merge adjacent to said blunt tip portion and provide said tip portion with oppositely-sloping sides meeting in a crest engageable with the headward side of the pectoral girdle of the fish for locating the fish lengthwise and guiding head-severing movement of the knife cutting portion following the same path traversed by said tip portion precisely along the headward side of the pectoral girdle.

2. In the fish beheading machine defined in claim 1, the blunt knife tip being rounded.

3. A method of beheading a fish which comprises supporting the fish on its side for lengthwise movement, engaging the gill cover of the fish with the blunt tip of a one-piece fish-beheading knife having opposite edges converging over the major portion of the length and width of the cutting portion of the knife toward a single tip portion which is an integral continuation of the cutting portion and located generally centrally of the knife width, the knife cutting portion having a convex side and having edges sharpened by being chamfered only on the convex side of the knife cutting portion which chamfered edges merge adjacent to the knife tip portion providing oppositely-sloping sides meeting in a crest, moving the knife and fish relatively in a direction transversely of the fish for engaging the crest formed by the chamfered edges with the headward side of the pectoral girdle of the fish for wedging the fish tailward by such knife crest engagement, and severing the fish head from the fish body by moving the cutting portion of the knife along the same path traversed by the tip portion adjoining the profile of the headward side of the pectoral girdle.

* * * * *

UNITED STATES PATENT OFFICE
CERTIFICATE OF CORRECTION

Patent No. 4,084,293      Dated April 18, 1978

Inventor(s) Elmer R. Hogan, Charles Edward Hollis and John I. Simpson

It is certified that error appears in the above-identified patent and that said Letters Patent are hereby corrected as shown below:

Title page, section [57] Abstract, line 10, before "pro-" insert --headward--.

Column 1, line 44, after "alongside" insert --the headward side of--.

Column 3, line 11, after "of the" insert --headward side of the--; line 15, after "chamfer" insert --crest--; same line, after "40" and before the comma insert --that engages the headward side of the collar bone--; line 26, after "concave." insert --As shown in Figure 5, the chamfered edges 41 and 42 merge adjacent to the tip 39 and form a tip portion with oppositely-sloping sides meeting in a crest 40 in continuation of the ridge 38, which crest is engageable with the headward side of the pectoral girdle of the fish as shown in Figure 4 for guiding head-severing movement of the knife precisely along the headward side of the pectoral girdle. As shown in Figure 5, the tip 39 is blunt lengthwise of the knife for a distance less than the length of such crest 40.--.

Column 4, line 1, after "the" insert --headward--; line 4, after "chamfer" insert --crest--; same line, cancel "and/or" and insert --formed by merging of--; line 5, before "pectoral" insert --headward side of the--; line 9, after "girdle" and before the period insert --as the cut is completed with the pectoral girdle or collar bone remaining attached to the fish as shown in Figure 4--; line 17, after "inward" and before the period insert --and the knife tip chamfer is pressing against the headward side of the collar bone--; line 18, before "40" insert --crest--; same line, after "40" cancel " and/or a marginal chamfer 41 or 42";

UNITED STATES PATENT OFFICE
CERTIFICATE OF CORRECTION

Patent No. 4,084,293          Dated April 18, 1978

Inventor(s) Elmer R. Hogan, Charles Edward Hollis and John I. Simpson

It is certified that error appears in the above-identified patent and that said Letters Patent are hereby corrected as shown below:

line 19, after "along the" insert --headward side of the--; line 34, after "the" insert --headward side of the--; line 40, after "with the" insert --headward side of the--; line 41, cancel "guide" and insert --girdle--; line 42, after "length" insert --tailward--; line 45, after "fish" and before the period insert --from its body while leaving the pectoral girdle attached to the body of the fish as shown in Figure 4--; line 48, before "pec-" insert --headward side of the--.

Column 5, line 21, cancel "fish beheading" and insert --fish-beheading--.

Signed and Sealed this

Third Day of October 1978

[SEAL]

Attest:

RUTH C. MASON
*Attesting Officer*

DONALD W. BANNER
*Commissioner of Patents and Trademarks*